(12) United States Patent
Blacklock et al.

(10) Patent No.: US 7,076,268 B2
(45) Date of Patent: Jul. 11, 2006

(54) PREVENTING INADVERTENT STRIKING OF KEYS AND LIKE BUTTONS IN HANDHELD PALM-TYPE DEVICES WHEN SUCH DEVICES ARE NOT IN HANDHELD USAGE

(75) Inventors: Brian D. Blacklock, Albuquerque, NM (US); Anthony Cappa Spielberg, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 64 days.

(21) Appl. No.: 10/845,537

(22) Filed: May 13, 2004

(65) Prior Publication Data
US 2005/0253815 A1    Nov. 17, 2005

(51) Int. Cl.
*H04M 1/00*    (2006.01)
*H04M 1/66*    (2006.01)

(52) U.S. Cl. .............. 455/550.1; 455/410; 379/433.01; 379/433.07

(58) Field of Classification Search ................ 455/407, 455/411, 550.1, 90, 410, 575.1, 556.2; 345/175, 345/168, 169; 379/433.07, 433.1; 341/22, 341/26; 713/310
See application file for complete search history.

(56) References Cited

U.S. PATENT DOCUMENTS

| | | | | |
|---|---|---|---|---|
| 5,337,353 A | * | 8/1994 | Boie et al. ............. | 379/433.01 |
| 5,884,156 A | * | 3/1999 | Gordon ........................ | 455/321 |
| 6,246,862 B1 | * | 6/2001 | Grivas et al. ................ | 455/566 |
| 6,330,457 B1 | * | 12/2001 | Yoon ........................ | 455/550.1 |
| 6,449,492 B1 | * | 9/2002 | Kenagy et al. ........... | 455/550.1 |
| 6,631,192 B1 | * | 10/2003 | Fukiharu ............... | 379/433.07 |
| 2002/0168961 A1 | * | 11/2002 | Ohba .......................... | 455/410 |
| 2003/0025679 A1 | * | 2/2003 | Taylor et al. ............... | 345/175 |
| 2004/0203512 A1 | * | 10/2004 | Ho et al. .................... | 455/90.3 |

* cited by examiner

*Primary Examiner*—George Eng
*Assistant Examiner*—Kiet Doan
(74) *Attorney, Agent, or Firm*—Jerry B. Kraft; Mark E McBurney

(57) ABSTRACT

A handheld palm-type device senses that it is being held in a human hand, but not any specific human hand. It can sense whether it is held in any human hand. A handheld palm-type device with keys for data entry and apparatus for preventing inadvertent striking of the keys when the palm-type device is not handheld that comprises the combination of an implementation on the device for sensing a bi-stable physical condition having an on state when the device is handheld and an off state when not handheld and apparatus responsive to the sensing means for locking the data entry keys when the off state is sensed. The device has a housing with a surface for engaging the palm of a user's hand so that the sensor means are at the surface that interfaces with the palm of the hand. The bi-stable electrical condition sensed may be temperature, electrical capacitance or resistance at the palm-device interface.

11 Claims, 3 Drawing Sheets

PREVENTING INADVERTENT STRIKING OF KEYS AND LIKE BUTTONS IN HANDHELD PALM-TYPE DEVICES WHEN SUCH DEVICES ARE NOT IN HANDHELD USAGE

TECHNICAL FIELD

The present invention relates to personal display terminals, generally referred to as personal handheld or palm-type devices, and, more particularly, to the prevention of inadvertent striking of keys in such palm devices.

BACKGROUND OF RELATED ART

Handheld mobile wireless palm-type communication devices such as Personal Digital Assistant (PDA) display terminals, e.g. PalmPilots™ and, of course, the wide variety of mobile wireless telephones, e.g. cellular telephones, have undergone a great expansion in usage in recent years and have been building a user base of hundreds of millions of these devices in present usage throughout the world. The small size and easy portability of these handheld devices makes them subject to often continual movement and rough handling, e.g. in briefcases, luggage, automobile glove boxes, shirt and other personal clothing pockets. All of these handheld devices have data entry keys ranging from a small number of control buttons to full alphanumeric keypads. The rough handling of these devices continuously exposes their input keys/buttons to inadvertent or random striking. The undesirable results of such striking may vary from the inadvertent telephone call or open line in cellular phones to corruption of data in PDAs, and, of course, attendant battery drainage. The current technology has developed many schemes for protecting input keys from such inadvertent or stray strikes. There have been electromechanical keypad covers that add a cumbersome aspect to the device and is likely to wear down with continuous usage. Other current solutions involve user initiated implementation wherein buttons/keypads may be disabled during transit. This has the troublesome result of having the user reactivate the keys when the device is turned on for usage and requires extra operations to be performed before the device is fully functional.

It should also be noted that users of handheld palm-type devices may frequently be technically unsophisticated. Thus, there is a need for keypad protection implementations that are simple, intuitive and user friendly. The present invention, which will be hereinafter described, provides such a simple implementation involving the user's hand itself. The invention is distinguishable from the existing technology of fingerprint identification as a means of locking or unlocking one specific user's computers through the sensing of a combination of physical characteristics, particular to only one user.

SUMMARY OF THE PRESENT INVENTION

The present invention involves an implementation whereby the handheld palm-type device senses that it is being held in a human hand, but not any specific human hand. It may be held in any human hand.

Accordingly, the present invention provides for a handheld palm-type device with keys for data entry, apparatus for preventing inadvertent striking of said keys when the palm-type device is not handheld that comprises the combination of means on said device for sensing a bi-stable physical condition having an on state when the device is handheld and an off state when not handheld and means responsive to the sensing means for locking the data entry keys when the off state is sensed. The device preferably includes a housing having a surface for engaging the palm of a user's hand so that the sensing means are at the surface that interfaces with the palm of the hand. The bi-stable electrical condition sensed may be electrical conditions such as resistance at the palm device interface. However, in the present preferred embodiments, these bi-stable states may be based on either capacitance or temperature levels. Thus, the two bi-stable states will be the temperature or the capacitance level reached when a human hand interfaces with the sensors as the sensor "On" state, and the capacitance or temperature level when the device is not handheld as the "Off" state.

In accordance with a particular aspect of this invention, there is provided delay means response to the sensing of an off state by the sensing means for delaying the locking of the keys for a predetermined time period combined with means responsive to the striking of any key during the predetermined time period for preventing the locking of said data entry keys. This will provide for the user removing his hand from the device for a period of time while still using the device. If the user resumes striking keys during this delay, the On state will not be interrupted. The user may be given the option of setting this delay time period based upon his usage habits.

Similarly, there may be provided delay means responsive to the sensing of an on state by the sensing means for delaying the unlocking of the keys for a predetermined time period combined with means responsive to the sensing means for preventing the unlocking of the data entry keys if a data entry key is not struck during the predetermined time period. This will provide for an unlikely situation wherein the user puts the device into a shirt or like pocket in which the sensors make contact with the user's body and the "On" capacitance or temperature level is inadvertently reached. Since there will be no keys struck during the delay period, the key pad will not be unlocked.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
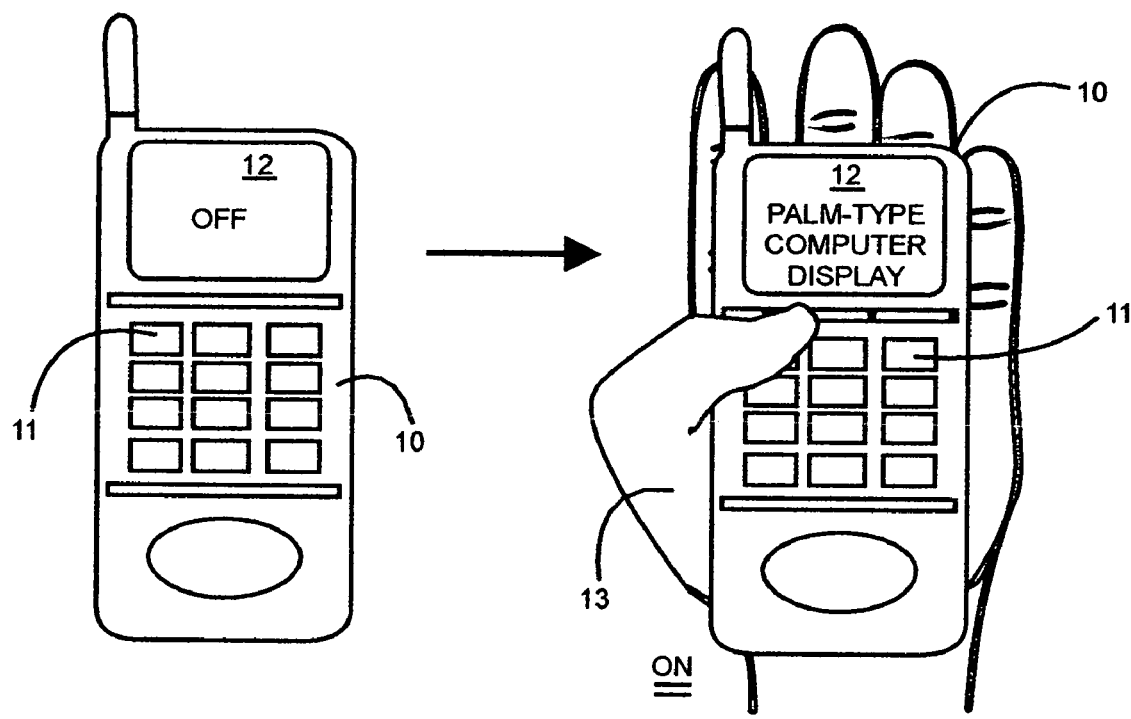
FIG. 1 is a generalized diagrammatic view of the handheld device in accordance with the present invention illustrating the Off state when the device is not handheld and the On state when the device is handheld.
Figure 2:
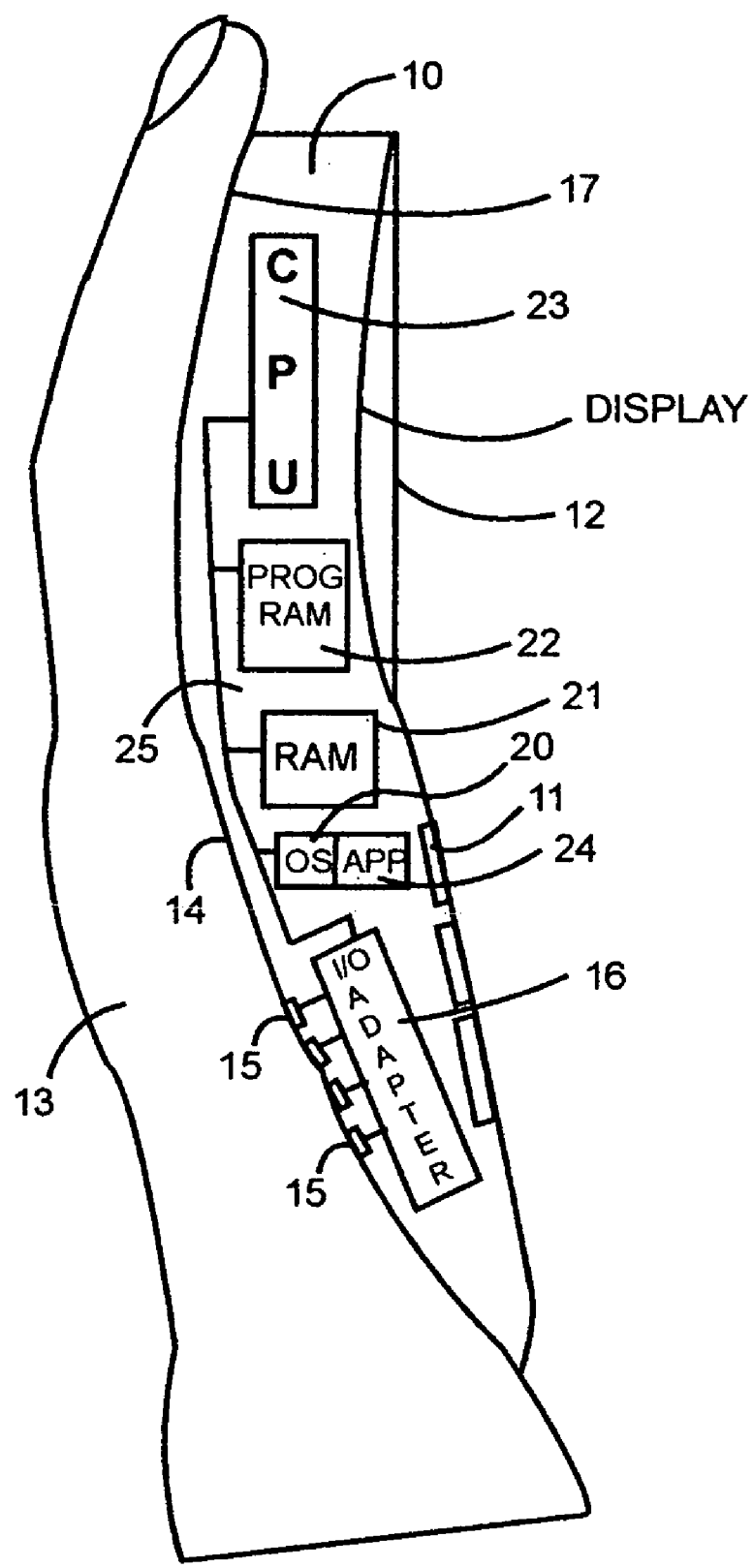
FIG. 2 is a generalized sectional view of the handheld device state of FIG. 1.

Referring to FIG. 1, there is shown a very generalized diagram of how the personal handheld palm-type device 10 keys 11 may be locked and unlocked dependent upon whether the device 10 is not held, and is, thus, in the OFF or keys 11 locked state, and then held to be switched to the ON or keys 11 unlocked state through the activation of heat sensors 15 in the rear surface 17 of the device 10, FIG. 2, whereby data may be entered and displayed on display 12.

When the device 10 is picked up and cradled in the palm of the hand 13, palm 14 interfaces with surface 17 of device 10. As will be hereinafter described in greater detail, sensors 15 sense the temperature or capacitance of the palm dependent on which sensing system is being used. The sensors may be any miniature thermocouple that has been conventionally used for decades for temperature sensing. Alternatively, the sensors may just be small miniature 3 volt capacitance proximity switch sensors. The sensors would operate off the conventional portable power supplies of the handheld palm-type devices. The sensors are connected via I/O adapter 16 to a central processing unit 23 that, in turn, is interconnected to various other components by system bus 25 and coordinates the operations. An operating system 20 that runs on central processing unit 23 provides control. The OS 35 is stored in Random Access Memory (RAM) 21. The application programs 24 controlling the sensing and key locking processes to be described with respect to FIG. 2 for the various handheld device functions, including those of the present invention, are permanently stored in Programmable Read Only Memory (PROG ROM) 22 and moved into and out of RAM to perform their respective functions.

Now, with respect to FIG. 3, there will be described the programming functions that implement the present invention. The On/Off keypad locking is based on a bi-stable or two state condition, e.g. for the present example: an On capacitance or temperature level, the palm capacitance or temperature and an Off capacitance or temperature level, the ambient capacitance or temperature level in the absence of the palm. Thus, the change in the Keypad lock condition is triggered by a change of the capacitance or temperature level from one state to the other. This event is monitored in step 30. If there is No change, the process flow is maintained at step 30 until Yes, the capacitance or temperature state has changed. Then, a further determination is made as to whether the change has turned the capacitance or temperature sensors from the Off to the On state, step 31. If Yes, this usually indicates that the user has put the device into his palm and the capacitance or temperature of the palm has turned the sensors On. However, there may be built into the process the capability to distinguish random or stray capacitance. For example, if the user has put the device into his shirt pocket and the surface with the sensors are against the user's body that raises the temperature or even capacitance level. As a safeguard, a delay timer is started, step 32, and a determination is made, step 34, as to whether any key has been struck during the delay period. If Yes, then this is an indication the capacitance or temperature change is due to the palm in actual usage, and the keys are turned On, step 36. On the other hand, if the delay period ends without any key strike as indicated by a Yes determination from delay over decision step 35, such a determination indicates that the temperature or capacitance is random, and the process is returned to initial step 30. Also, after the keys are turned On in step 36, the process is returned to step 30 where any further change in sensed state is monitored. It should be noted that when reference is made to the keypad or keys being turned On or Off, it is not meant that the keys become locked or mechanically immobile. Rather, in the Off key condition, the keystrokes do not affect the device system or display in the conventional operational manner.

Figure 3:
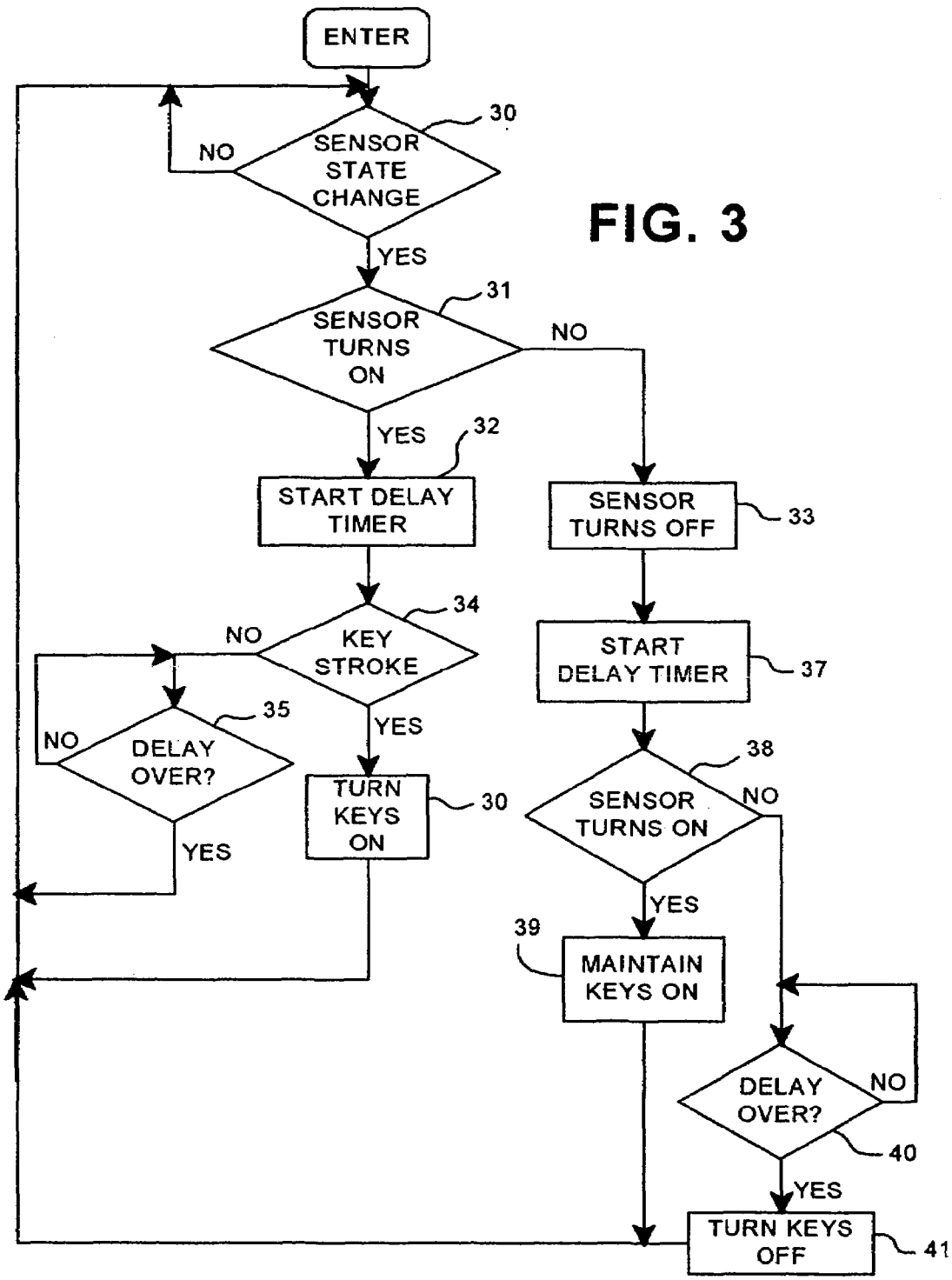
FIG. 3 is a flowchart of the logical sequence of steps involved in the Keypad On and Off states.

Returning now to the explanation of the flow diagram of FIG. 3, if the determination in step 31 is No, the sensors did not turn On, then the previously determined change in state was a change from a capacitance or temperature sensor On to capacitance or temperature sensor Off, step 33. Here again, a delay timer is started, step 37. The capacitance or temperature change may have been due to the user putting the device out of his hand but still intending to continue his use of it. In the case of a wireless telephone or cell phone device, the discontinuance of the hand hold may be just a matter of a few seconds, but in a palm-type computer device, the reasonable delay may be a matter of even several minutes dependent upon the user's work habits. Thus, provision may be made, during the preliminary setting up of the device functions, for the user to set his preferred predetermined delay. Next, a determination is made as to whether the sensors turn On again, step 38. If Yes, then the keys are maintained On, step 39. If the delay period is determined to be over, Yes from decision step 40, and the user has not palmed the device again, then the keypad is turned Off. After, steps 36, 39 and 41, the process is returned to the initial sensor determining state 30.

While the illustrative example has been described with respect to capacitance or body temperature sensing, it should be understood that the present invention may be practiced using other conventional biometric sensors for the palm-device interface including resistance sensors.

The bilevel capacitance sensors preferably used are low voltage capacitance proximity switches using the capacitance of the human body, e.g. palm of the hand. Because of their low power requirements, they may be quite effectively used as sensors in the mobile handheld palm-type communication and computer devices.

Although certain preferred embodiments have been shown and described, it will be understood that many changes and modifications may be made therein without departing from the scope and intent of the appended claims.

What is claimed is:

1. In a handheld palm-type device with keys for data entry, apparatus for preventing inadvertent striking of said keys when the palm-type device is not handheld comprising:
   means on said device for sensing a bi-stable physical condition selected from the group consisting of a temperature condition, an electrical capacitance condition, and an electrical resistance condition having an on state when said device is handheld and an off state when not handheld;
   means responsive to said sensing means for locking said data entry keys when said off state is sensed;
   delay means responsive to said sensing of an off state by said sensing means for delaying said locking of said keys for a predetermined time period; and
   means responsive to the striking of any key during said predetermined time period for preventing the locking of said data entry keys.

2. The handheld palm-type device of claim 1 further comprising:
   a housing having a surface for engaging the palm of a user's hand; and
   wherein said sensing means are at said surface.

3. The handheld palm-type device of claim 2 wherein said sensed bi-stable condition is temperature.

4. The handheld palm-type device of claim 2 wherein said sensed bi-stable condition is electrical capacitance.

5. The handheld palm-type device of claim 2 wherein said sensed bi-stable condition is electrical resistance.

6. The handheld palm-type device of claim 1 further including:
   delay means responsive to said sensing of an on state by said sensing means for delaying the unlocking of said keys for a predetermined time period; and means responsive to said sensing means for preventing the unlocking of said data entry keys if a data entry key is not struck during said predetermined time period.

7. In a handheld palm-type device with keys for data entry, a method for preventing inadvertent striking of said keys when the palm-type device is not handheld comprising:

sensing a bi-stable physical condition selected from the group consisting of a temperature condition, an electrical capacitance condition, and an electrical resistance condition having an on state when said device is handheld and an off state when not handheld;

locking said data entry keys when said off state is sensed;

responsive to said sensing of an off state, delaying said locking of said keys for a predetermined time period; and preventing the locking of said data entry keys responsive to the striking of any key during said predetermined time period.

8. The method of claim 7 wherein said sensed bi-stable condition is temperature.

9. The method of claim 7 wherein said sensed bi-stable condition is electrical capacitance.

10. The method of claim 7 wherein said sensed bi-stable condition is electrical resistance.

11. The method of claim 7 further including:

delaying the unlocking of said keys for a predetermined time period responsive to said sensing of an on state; and preventing the unlocking of said data entry keys if a data entry key is not struck during said predetermined delay time period.

* * * * *